Nov. 30, 1954 L. ROSEMAN 2,695,578
MACHINE FOR STITCHING TOGETHER ANGULARLY
RELATED STRIPS OF MATERIAL
Filed April 21, 1952 7 Sheets-Sheet 1

Inventor:
Leo Roseman
BY
Attorney.

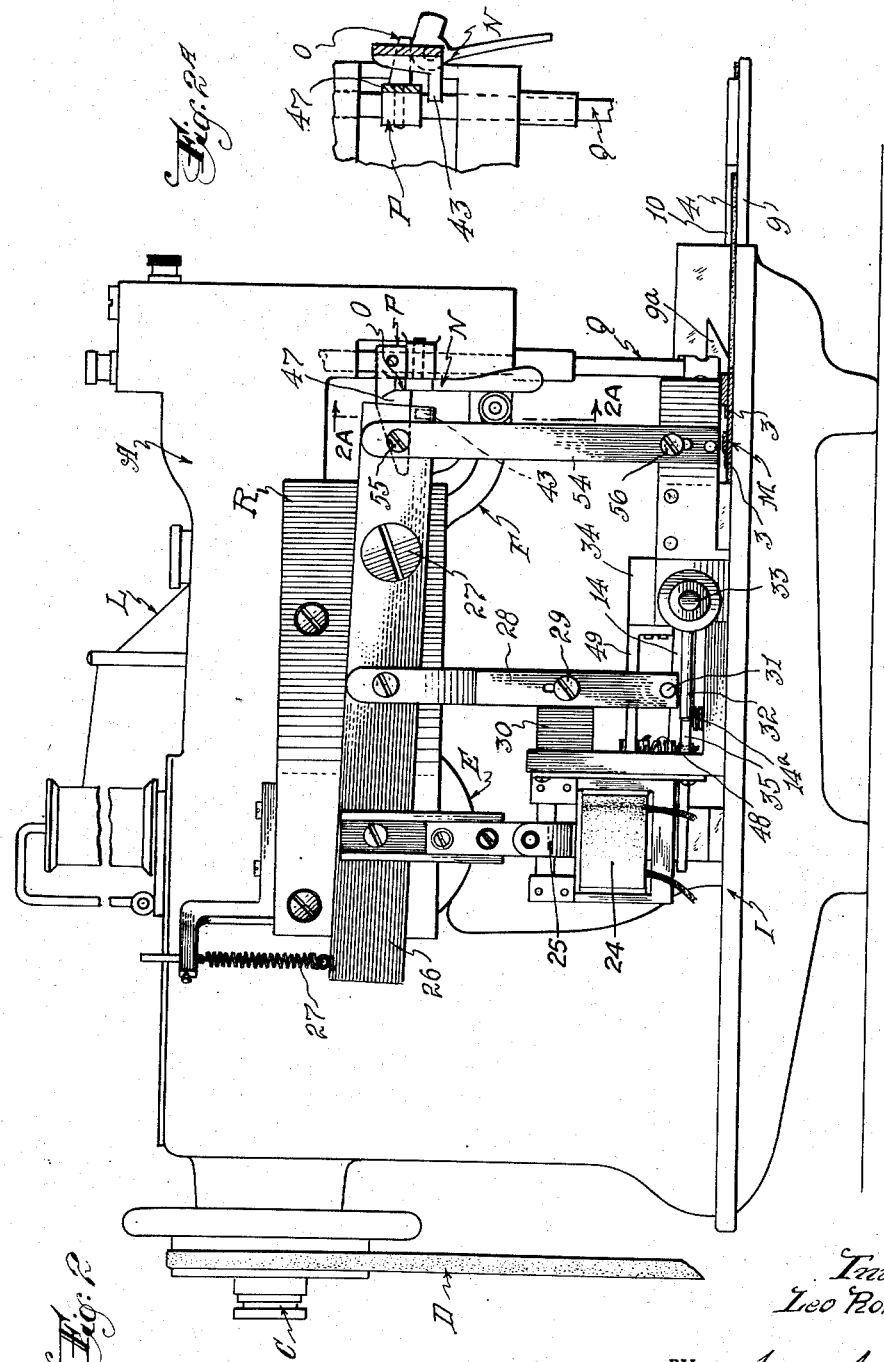

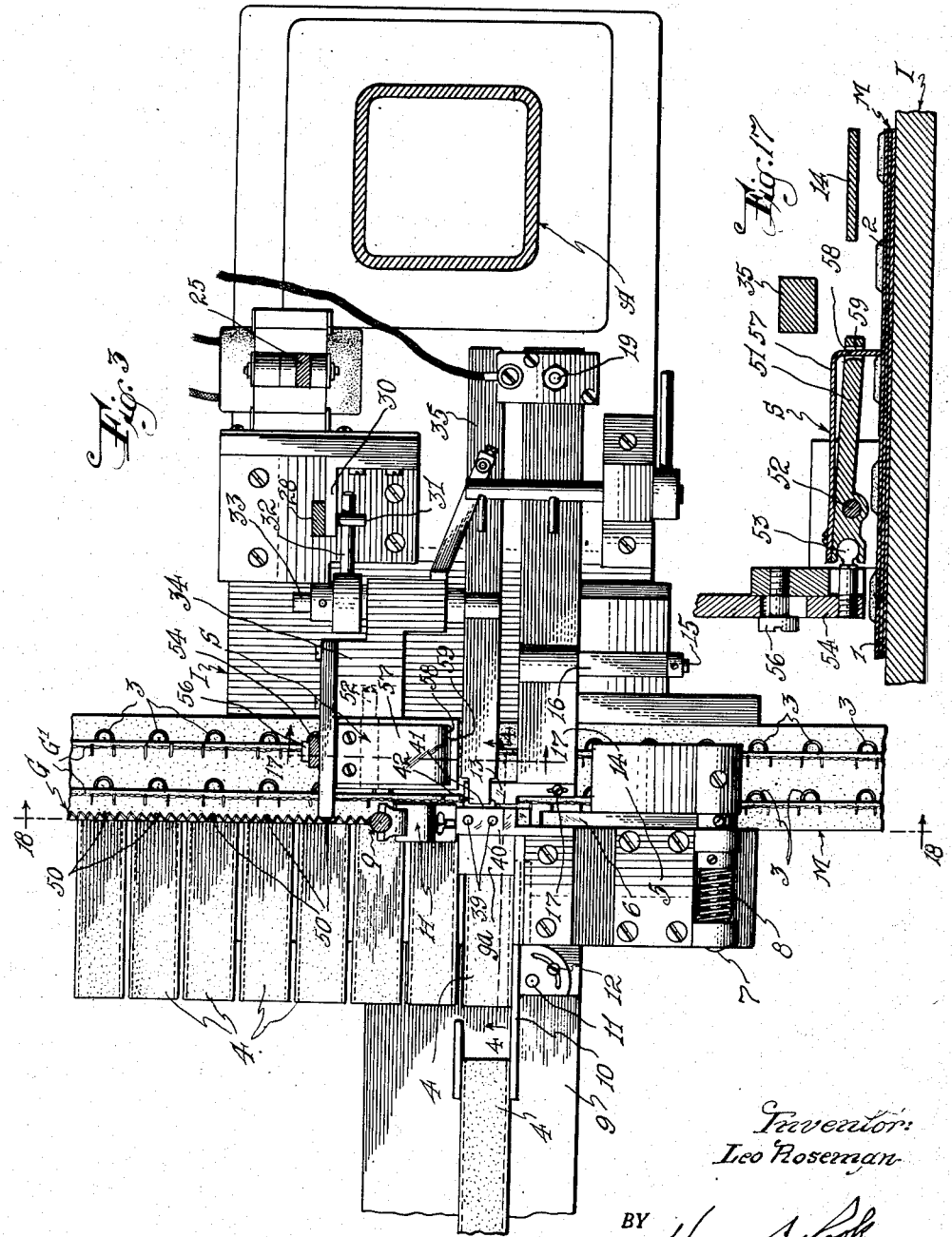

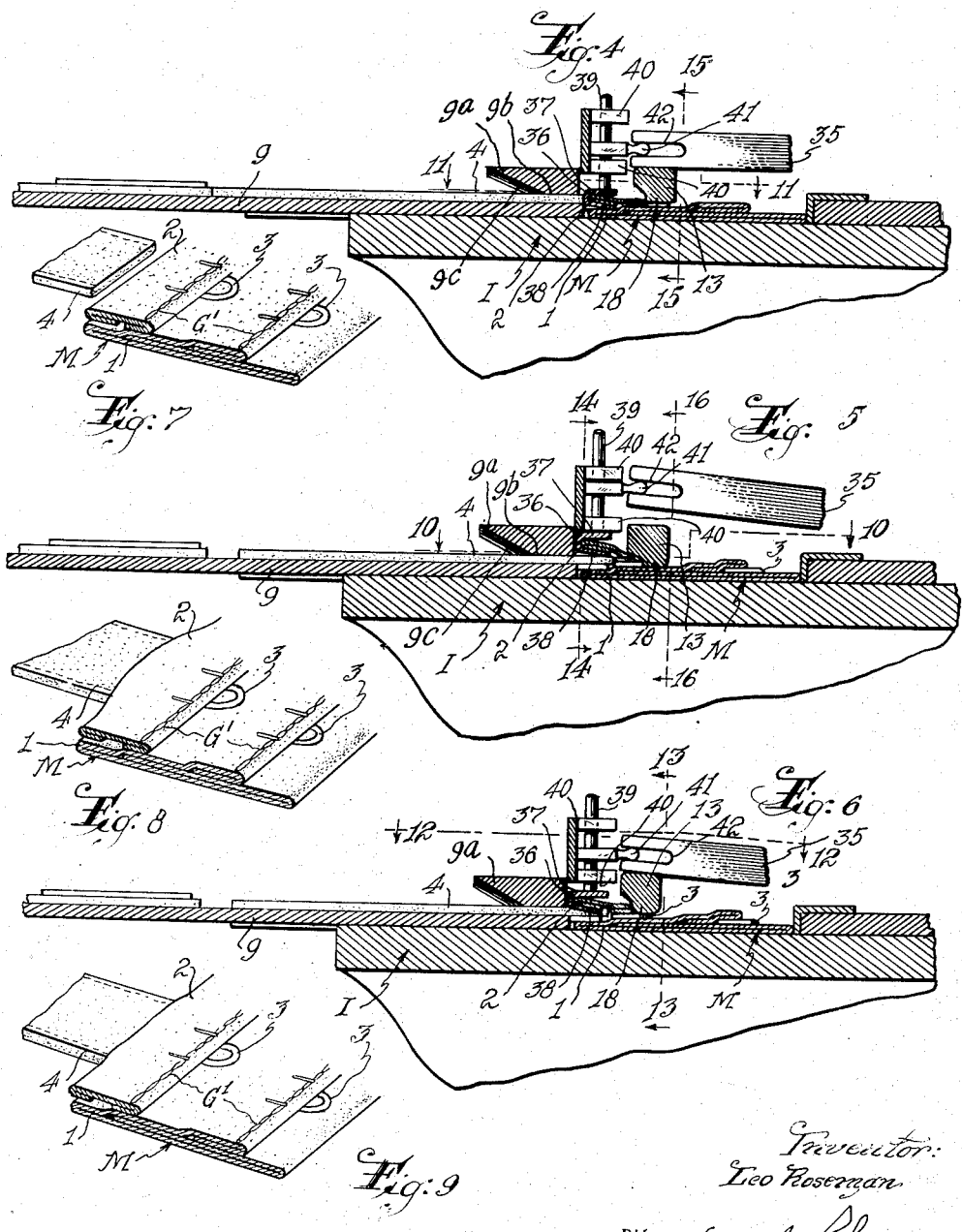

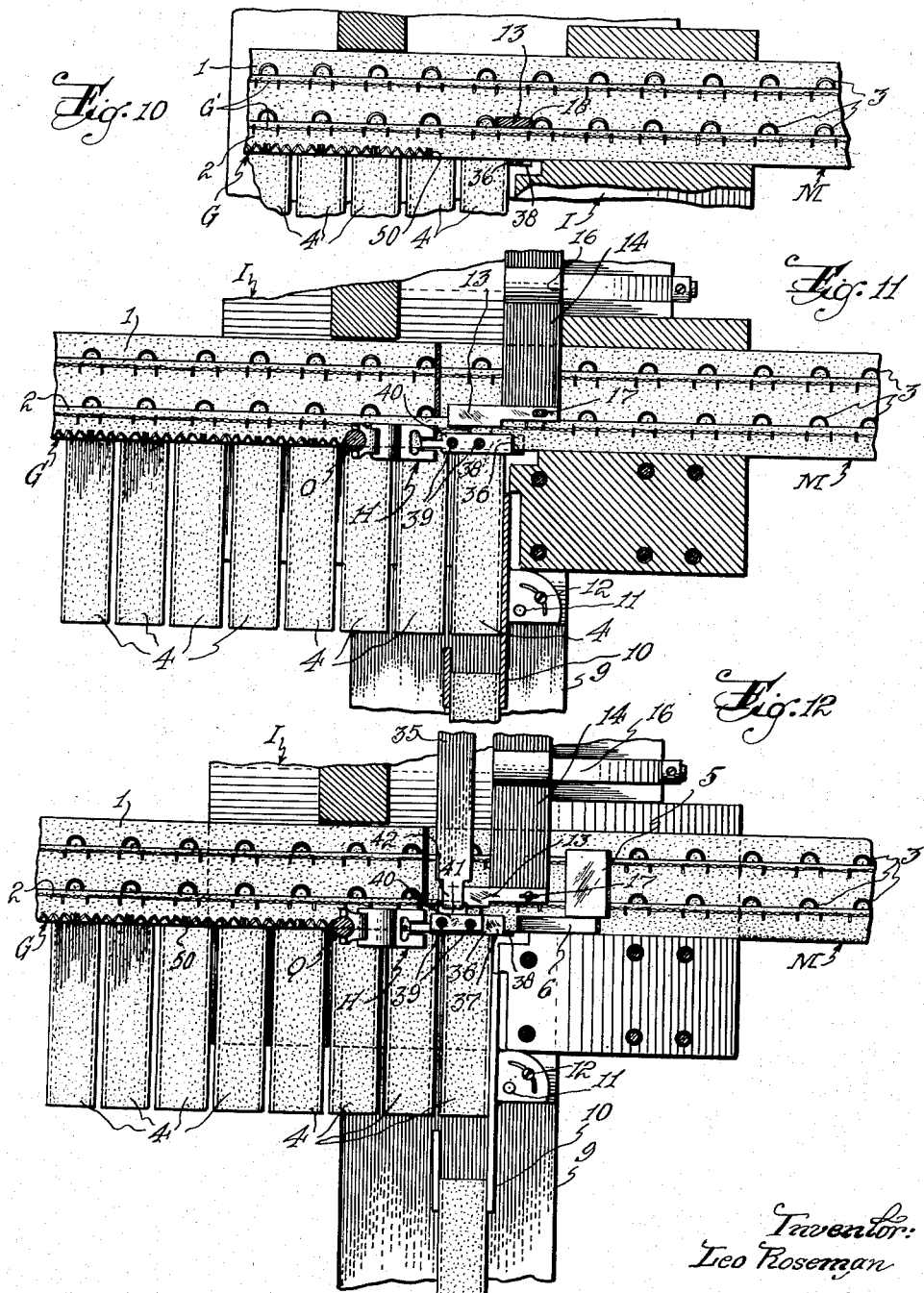

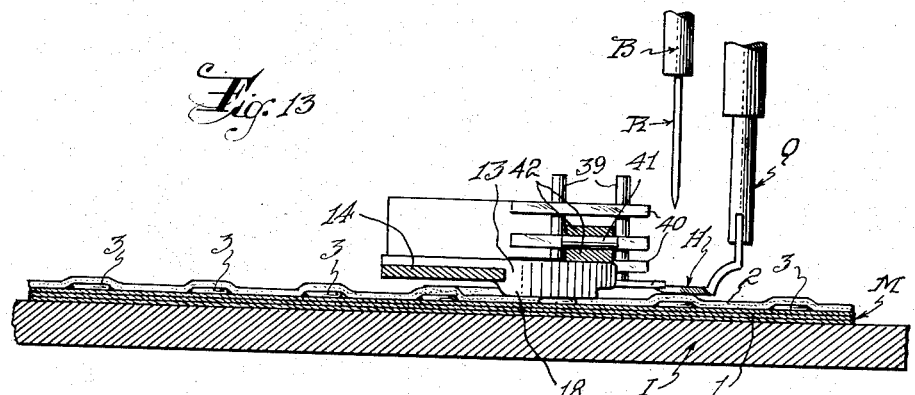
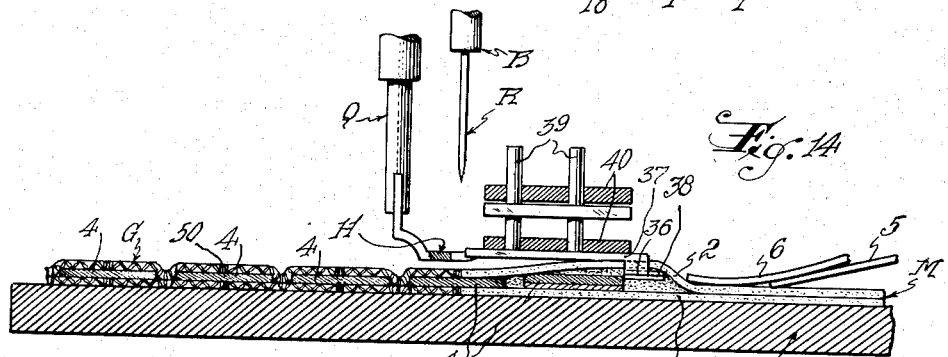
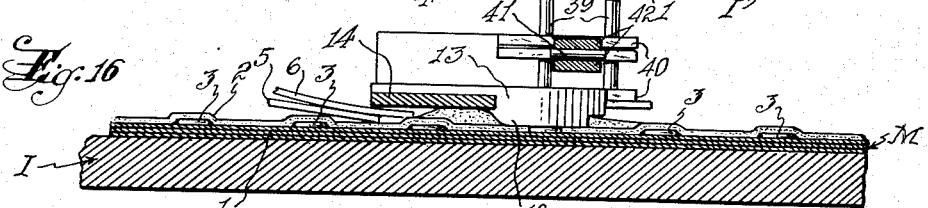
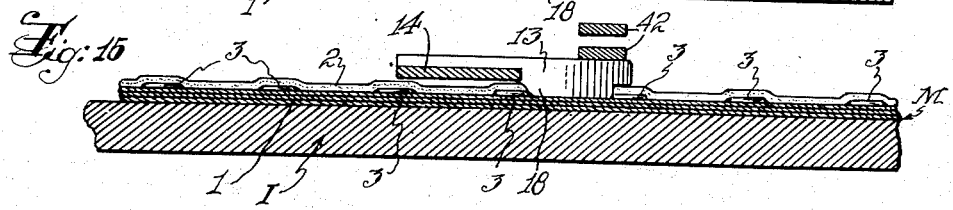

Nov. 30, 1954

L. ROSEMAN 2,695,578

MACHINE FOR STITCHING TOGETHER ANGULARLY RELATED STRIPS OF MATERIAL

Filed April 21, 1952

Inventor:
Leo Roseman
BY
Harry N. Rook,
Attorney.

United States Patent Office 2,695,578
Patented Nov. 30, 1954

2,695,578
MACHINE FOR STITCHING TOGETHER ANGULARLY RELATED STRIPS OF MATERIAL

Leo Roseman, Newark, N. J.

Application April 21, 1952, Serial No. 283,285

6 Claims. (Cl. 112—2)

This invention relates in general to a machine for sewing a plurality of short strips of material onto a long continuous strip of material in spaced relation longitudinally of said long strip, and more particularly the invention is directed to a machine for stitching on to a continuous strip of fabric having eye fasteners or the like spaced longitudinally thereof, a plurality of elastic straps in spaced side by side relation longitudinally of the continuous strip with one elastic strip in substantial alignment with each of the eye fasteners or the like. This operation is incidental to the manufacture of sections of adjustable fasteners to be used, for example, in connecting the rear end portions of brassières or the like, the continuous strip being transversely severed between the short elastic straps into independent sections each including an elastic strap and a section of the continuous strip having one of said fastener elements or the like thereon.

It is essential to have the elastic straps in true right angular relation to the continuous strip and with the median longitudinal line of each elastic strap substantially in alignment with one of said fastener elements or the like, and a prime object of the invention is to provide a machine embodying novel and improved features of construction to attain such a result.

Another object is to provide a machine of this character wherein the continuous strip shall be fed by the usual sewing machine mechanism, and means shall be provided for automatically stopping the feed at pre-determined points to insure the attachment of the elastic strap to the continuous strip in the desired relation to the fastener elements or the like.

Another object is to provide such a machine wherein the means for controlling the stopping of feed shall include an element controlled by the fastener elements so that the feed of the continuous strip shall be stopped automatically when a fastener element reaches a predetermined point and an elastic strap shall be fed into proper relation to the continuous strip and said fastener elements while the continuous strip is stationary.

The invention especially contemplates the sewing of the elastic strap between two flaps or layers of the continuous strip, and another object of the invention is to provide in the machine novel and improved means for separating said flaps at one edge of the continuous strip, to receive the end of an elastic strap and for clamping the elastic strap in proper relation to the continuous strip after insertion of the strap between said flaps and until the strap has been sewn between the flaps.

A still further object is to provide in a machine of this character novel and improved means for clamping the main or continuous strip against movement while the feed is stopped and during insertion of an elastic strap.

Other objects, advantages and results of the invention will be brought out by the following description in conjunction with the accompanying drawings in which Figure 1 is a front elevational view of a known type of sewing machine for producing a line of zig-zag lock stitching, and the mechanism of the invention is controlling the feed of the continuous strip;

Figure 2 is a rear elevational view of the machine and said mechanism;

Figure 2A is a fragmentary transverse vertical sectional view approximately on the plane of the line 2A—2A of Figure 2;

Figure 3 is a horizontal sectional view approximately on the plane of the line 3—3 of Figure 1 with portions of the sewing machine omitted;

Figure 4 is an enlarged transverse vertical sectional view approximately on the plane of the line 4—4 of Figure 3, showing the parts in the position assumed during normal feed of the main or continuous strip;

Figure 5 is a similar view showing the parts in the position assumed when the feed is stopped and during the insertion of the elastic strap;

Figure 6 is a view similar to Figure 4 showing the flap lifter and strap clamp immediately upon the starting of the feed after the insertion of the elastic strap;

Figure 7 is a fragmentary composite perspective view of a portion of the main or continuous strip and one of the elastic straps in the same relative positions shown in Figure 4;

Figure 8 is a similar view of the main strip and the elastic strap in the relative positions shown in Figure 5;

Figure 9 is a like view of the main strip and elastic strap related as illustrated in Figure 6;

Figure 10 is a horizontal sectional view approximately on the plane of the line 10—10 of Figure 5 with the figure turned 90° on the sheet;

Figure 11 is a similar view on the plane of the line 11—11 of Figure 4;

Figure 12 is a like view on the plane of the line 12—12 of Figure 6;

Figure 13 is a fragmentary vertical longitudinal sectional view approximately on the plane of the line 13—13 of Figure 6;

Figure 1:
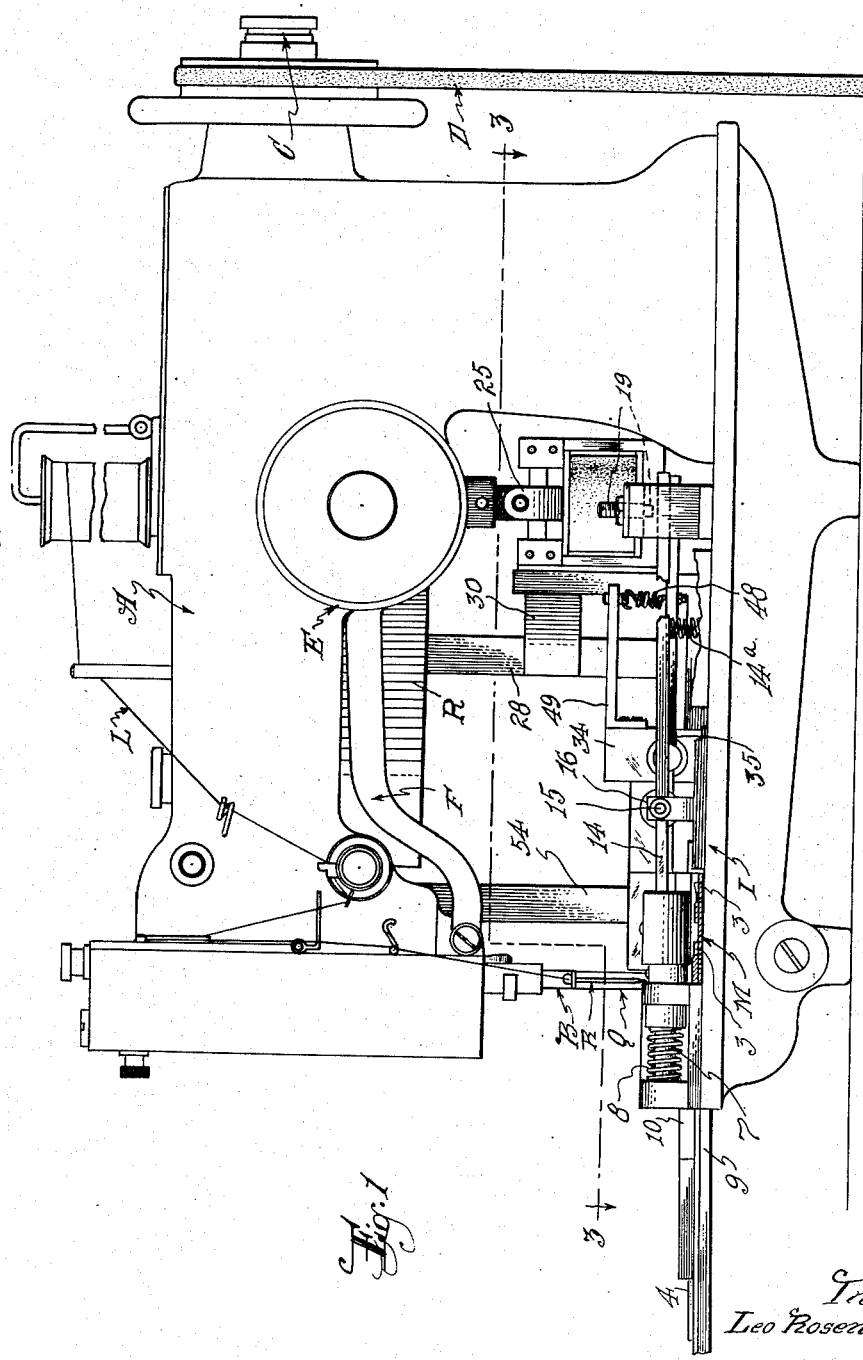
Figure 18:
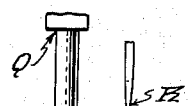
Figure 19:
Figure 20:
Figure 21:
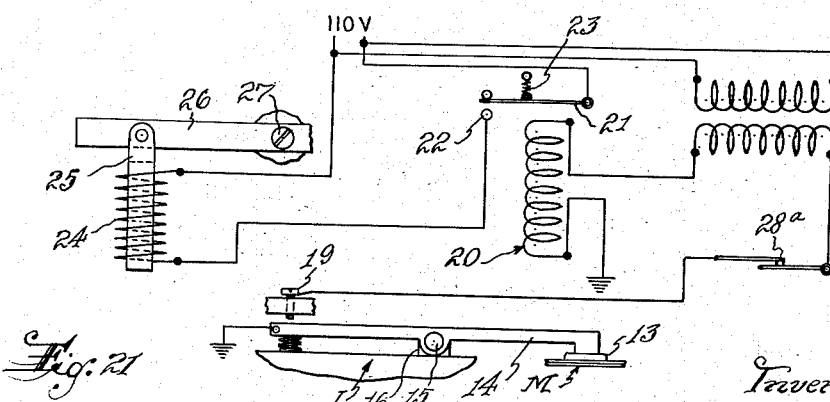

Figures 14 and 15 are views similar to Figure 13 approximately on the planes of the respective lines 14—14 and 15—15 of Figures 5 and 4;

Figure 16 is a vertical longitudinal sectional view approximately on the plane of the line 16—16 of Figure 5 with portions omitted for clearness and illustration;

Figure 17 is an enlarged vertical longitudinal sectional view approximately on the plane of the line 17—17 of Figure 3 with portions omitted for clearness;

Figure 18 is an enlarged vertical longitudinal sectional view approximately on the plane of the line 18—18 of Figure 3 with the figure turned 90° on the sheet and illustrating the pressure foot and work feed dog in work-feeding relation;

Figure 19 is a similar view of the manner of feeding the continuous strip in a forward direction;

Figure 20 shows the relationship of the pressure foot and feed dog at the end of one feeding operation; and Figure 21 is a wiring diagram.

Specifically describing the illustrated embodiment of the invention, the reference character A generally designates a known type of sewing machine for producing zig-zag stitching, the machine including a needle bar B which is driven by the usual mechanism through a shaft C and belt and pulley connection D from a suitable source of power such as an electric motor. The needle bar is reciprocable and is also laterally swung or oscillated during feed of the work by known mechanism E which has an operative connection with the drive shaft of the machine and includes a link F connected to the needle bar mounting, so that the combined oscillation of the needle and the longitudinal feed of the work produces a line of zig-zag stitches that geenrally are designated G.

The machine also includes the usual work-feed mechanism which includes a presser foot H to yieldingly press the work against the bed plate I of the machine, and a work feed dog K which is simultaneously raised and moved longitudinally in one direction to feed the work as shown in Figure 18 and is lowered and simultaneously moved in the opposite direction as shown in Figure 20, to stop the feed of the work and return to the initial position for the next feeding impulse as shown in Figure 18. The feed dog is connected to a lever and link mechanism which in turn is operated from the drive shaft of the machine in a known manner.

Also the machine includes the usual top or needle thread L and a bottom or bobbin thread (not shown) for forming stitches.

The presser foot H is normally influenced toward the bed plate to grip the work by a spring (not shown) and may be manually raised and held in spaced relation to the work by the usual cam finger lever N which engages a finger O projecting from a sleeve P that is pinned or otherwise secured on the presser foot bar Q.

The work in the present instance includes a continuous or main strip of fabric M which has lower and upper flaps 1 and 2, best shown in Figures 4 and 14, and a plurality of fastener elements 3 in the form of wire eyes stitched on the strip in equidistantly spaced relation longitudinally thereof. The machine of the invention sews on to said main strip between said flaps by a line of stitches G, a plurality of elastic straps 4 in spaced relation longitudinally of the main strip and each in alignment or directly opposite one of the fastener elements 3.

In starting the operation, one end of the continuous or main strip M is manually placed beneath the presser foot and the presser foot yieldingly presses the work against the bed plate as shown in Figure 19. The feed is then started in any suitable manner as by closing a switch in an electric motor circuit or by operating a clutch between a source of power and the machine, and the feed will continue until the presser foot H is raised from the work as shown in Figures 14 and 20. A pair of spring fingers 5 and 6 mounted on a shaft 7 which is normally influenced in the direction of the arrow in Figure 18 by a torque spring 8, are normally pressed against the upper flap 2 and the main portion of the main strip M, respectively, to insure presentation of the strip to the work feed mechanism in smooth unwrinkled condition.

In accordance with the invention, the feed of the main strip is automatically stopped at a pre-determined point to permit the insertion of one of the elastic straps 4 between the flaps 1 and 2 for subsequent sewing of the strap to the main strip.

Accordingly, at one side of the path of feed of the main strip is arranged a guide for the elastic straps 4, said guide being shown as comprising a horizontal plate 9 projecting laterally from the bed plate of the machine and the longitudinal edge of the main strip. A guide rail 10 is mounted on the plate 9 in perpendicular relation thereto, said guide plate preferably being adjustable into proper angular relation, in the present instance, perpendicular, to the edge of the main strip; for example, the rail may be pivotally mounted at 11 on a vertical axis on the plate 9 and be provided with means such as a screw and slot 12 for holding it in adjusted position.

Disposed above the plate 9 is a guide block 9a having an undersurface 9b spaced from the plate 9 a distance slightly greater than the thickness of the strap 4, said block also having a beveled surface 9c which is so inclined as to guide the strap accurately between the flaps of the main strip and at the same time influence the strap against the guide rail 10.

In feeding the elastic strap to the main strip, the strap is slid longitudinally along the rail 10 on the plate 9 to the right in Figures 3, 4 and 5. This feeding of the strap may be done manually as here illustrated or automatic means may be provided for feeding the straps in timed relation to the stopping of the feed of the main strip.

For automatically stopping the feed of the main strip with a fastener element 3 in proper relation to the guide rail 10 to receive an elastic strap, a shoe 13 is mounted at one end of a lever 14 which is secured intermediate its ends on a shaft 15 which is pivotally mounted in a suitable bearing bracket 16 on the machine. The shoe is mounted for adjustment longitudinally of the main strip, as by a screw and slot connection 17 with the lever 14. The lower edge of the shoe has a portion 18 of a length approximately equal to the distance between two of the fastener elements 3 as best shown in Figure 15 so that as the main strip is fed, each fastener element will move under and raise the shoe and the shoe will be actuated by a spring 14a against the strip M between each two adjacent fastener elements. The parts are so related that while the shoe is in its upper position, resting on a fastener element, the opposite end of the lever 14 is held in spaced relation to a contact screw 19 so as to hold open an electric circuit through the winding 20 of a relay (Figure 21) which includes a switch arm 21 cooperating with a contact 22 and normally influenced away from said contact by a tension spring 23. Upon energization of the solenoid or winding 20, the switch 21—22 is closed and energizes a winding 24 of an electro-magnet which includes an armature 25 one end of which is connected to a lever 26 that is pivoted at 27 on a bracket R secured on the machine frame. The solenoid 20 will remain energized until a normally closed switch 28a is opened.

The lever 26 is normally actuated by a spring 27 in the direction opposite that in which it is actuated by the electro-magnet. When the lever is actuated by the electro-magnet, it raises the presser foot from the work and stops the feed of the main strip as shown in Figure 18. This is effected by a finger 43 at one end of the lever which engages under an arm 47 on the collar P that is attached to the presser foot bar Q (Figure 2A). At the same time, the flaps 1 and 2 of the main strip are separated in a manner now to be described.

As shown in Figure 2, as one end of the lever is pulled downwardly by the electro-magnet, the lever pushes downwardly on a link 28 one end of which is connected to the lever 26. The intermediate portion of the link 28 is guided by a screw and slot connection 29 on a bracket 30 on the machine and the other end of said link has a lateral pin 31 which engages a stud 32 projecting laterally from a shaft 33 that is journaled in a bracket 34 on the frame and has connected thereto a lever 35 one end of which is connected to a flap separator and strap clamp 36 which comprises upper and lower flanges 37 and 38, respectively, which receive between them the upper flap 2 of the main strip (Figures 4 and 14). The flap separator and strap clamp is mounted for vertical movement by pins 39 that are vertically slidable in a bracket 40, and the pins are connected by a knuckle member 41 which has a cylindrical head received within the bifurcation 42 at one end of the lever 35. Thus, when the electro-magnet is energized, the lever 35 is swung upwardly from the normal position shown in Figure 4 into the position shown in Figure 5 to separate the upper and lower flaps of the main strip so that an elastic strap 4 can be slid between these flaps as shown in Figure 5 while the main strip is stationary.

After the strap has been inserted between the flaps, the feed of the main strip is started again by opening the switch 28 which deenergizes the solenoid 20 and permits the switch 21—22 to be opened. This deenergizes the electromagnet winding 24 so as to allow the spring 27 to return the lever 26 to its normal position as shown in Figure 2. This action allows the presser foot to be forced downwardly by its spring into contact with the work, whereupon the feed of the main strip is started.

At the same time, the lever 35 is returned to its normal position by a spring 48 one end of which is connected to the lever while the other end is connected to a bracket 49 on the machine frame. This causes the flap separator and clamp 36 to be forced downwardly so as to clamp the end of the elastic strap and hold it against accidental displacement while it is moved to the stitching position. As the strap is moved into stitching position, the needle forms the line of zig-zag stitches G so as to firmly sew the strap on to the main strip.

The parts are so arranged that when the main strip is stopped to receive one strap, the needle is disposed about on the longitudinal median line of the next preceding strap, and due to the momentum of the machine several superposed stitches 50 are formed while the main strip is stationary. This provides a reinforced connection of the strap to the main strip.

To positively hold the main strip against longitudinal movement after it has been stopped, I provide a clamp S which includes a lever 51 pivotally connected its end at 52 on the bracket 34. One end of the lever has a pivotal connection 53 to a link 54 which has one end pivotally connected at 55 to the lever 26 and is guided by a screw and slot connection 56 with the bracket 34. A presser spring 57 has one end connected to the lever and its other end turned downwardly at 58 and passed through an opening 59 in the lever for contract with the top of the main strip M. Normally the lever 51 ih held by the lever 26 with the down turned end of the spring in spaced relation to the main strip. However, when the electro-magnet is actuated to move the lever 26, the lever 51 is swung to force the down turned end 58 of the spring 57 into contact with the main strip, thereby to hold the main strip against longitudinal movement. The spring provides a yielding contact and compensates for any excess force tending to swing the lever 51 downwardly that might injure the main strip.

Preferably, one or more stationary fingers 57 are provided in overlying relation to the lower flap 1 of the main strip to hold said strip against accidental raising during the operation of the machine.

It will be understood by those skilled in the art that automatic mechanism may be provided for stopping the machine when the shoe 13 drops between two adjacent fastener elements; and also means may be provided for starting the machine automatically by and upon insertion of the straps between the flaps of the main strip. Furthermore, if no reinforcing stitches, such as stitches 50, are required, the feed stopping could be eliminated, i. e. the feed of the strip M would be continuous and the flaps would be separated in timed relation to the positions of the fastener elements.

With the machine of the invention it will be observed that the straps can be easily and quickly inserted into exactly the proper angular relation to the main strip and thereafter accurately stitched on to the main strip, all with a minimum of care on the part of the operator. Accordingly, the straps can be rapidly secured to the main strip in exactly the desired relation thereto.

Other modifications and changes in the construction of the machine will occur to those skilled in the art as within the spirit and scope of the invention. For example, instead of raising the presser foot to stop the feed of the work, the work feed dog might be lowered out of engagement with the work.

What I claim is:

1. In a sewing machine, the combination of stitching forming mechanism including a reciprocating needle, work-feeding means for moving beneath said needle an elongate strip of material having elements projecting from and spaced longitudinally of one surface thereof, guide means for directing a relatively short strap into overlapping and angular relation to a longitudinal edge of said elongate strip at a point ahead of said needle, and feed-stopping means controlled by said elements for automatically stopping the feed of said elongate strip with one of said elements in predetermined relation to said guide means, said work-feeding means including a feed dog beneath the work and a vertically reciprocable presser foot normally yieldingly influenced to grip the work between said presser foot and said feed dog to move said elongate strip, and the feed-stopping means including mechanism for changing the relation of said presser foot and said feed dog to stop the feed of said elongate strip.

2. In a sewing machine, the combination of stitching forming mechanism including a reciprocating needle, work-feeding means for moving beneath said needle an elongate strip of material having elements projecting from and spaced longitudinally of one surface thereof, guide means for directing a relatively short strap into overlapping and angular relation to a longitudinal edge of said elongate strip at a point ahead of said needle, and feed-stopping means controlled by said elements for automatically stopping the feed of said elongate strip with one of said elements in predetermined relation to said guide means, said feed-stopping means including a vertically movable shoe beneath which said elements are movable during the feeding movement of said elongate strip to cause movement of the shoe in one direction, said shoe having a portion of a length approximately equal to the distance between each two adjacent elements to enter between two adjacent elements for causing movement of said shoe in the opposite direction.

3. In a sewing machine, the combination of stitching forming mechanism including a reciprocating needle, work-feeding means for moving beneath said needle an elongate strip of material having elements projecting from and spaced longitudinally of one surface thereof, guide means for directing a relatively short strap into overlapping and angular relation to a longitudinal edge of said elongate strip at a point ahead of said needle, and feed-stopping means controlled by said elements for automatically stopping the feed of said elongate strip with one of said elements in predetermined relation to said guide means, said work-feeding means including a feed dog beneath the work and a vertically reciprocable presser foot normally yieldingly influenced to grip the work between said presser foot and said feed dog to move said elongate strip, and the feed-stopping means including mechanism for changing the relation of said presser foot and said feed dog to stop the feed of said elongate strip, said feed-stopping means including a vertically movable shoe beneath which said elements are movable during the feeding movement of said elongate strip to cause movement of the shoe in one direction, said shoe having a portion of a length approximately equal to the distance between each two adjacent elements to enter between two adjacent elements for causing movement of said shoe in the opposite direction.

4. In a sewing machine, the combination of stitching forming mechanism including a reciprocating needle, work-feeding means for moving beneath said needle an elongate strip of material having elements projecting from and spaced longitudinally of one surface thereof, guide means for directing a relatively short strap into overlapping and angular relation to a longitudinal edge of said elongate strip at a point ahead of said needle, and feed-stopping means controlled by said elements for automatically stopping the feed of said elongate strip with one of said elements in predetermined relation to said guide means, said feed-stopping means including a vertically movable shoe beneath which said elements are movable during the feeding movement of said elongate strip to cause movement of the shoe in one direction, said shoe having a portion of a length approximately equal to the distance between two adjacent elements for causing movement of said shoe in the opposite direction, a normally open electric switch including two relatively movable contact members one of which is moved by said shoe into engagement with the other to close the switch when the shoe drops between two adjacent elements and an electric circuit including said switch and an electromagnet controlled thereby, and means actuated by said electromagnet for changing the relation of said presser foot and said work-feeding means.

5. In a sewing machine, the combination of stitching forming mechanism including a reciprocating needle, work-feeding means for moving beneath said needle an elongate strip of material having elements projecting from and spaced longitudinally of one surface thereof, guide means for directing a relatively short strap into overlapping and angular relation to a longitudinal edge of said elongate strip at a point ahead of said needle, and feed-stopping means controlled by said elements for automatically stopping the feed of said elongate strip with one of said elements in predetermined relation to said guide means, said work-feeding means including a feed dog beneath the work and a vertically reciprocable presser foot normally yieldingly influenced to grip the work between said presser foot and said feed dog to move said elongate strip, and the feed-stopping means including mechanism for raising said presser foot out of work-feeding relation to said feed dog.

6. In a sewing machine, the combination of stitching forming mechanism including a reciprocating needle, work-feeding means for moving beneath said needle an elongate strip of material having elements projecting from and spaced longitudinally of one surface thereof, guide means for directing a relatively short strap into overlapping and angular relation to a longitudinal edge of said elongate strip at a point ahead of said needle, and feed-stopping means controlled by said elements for automatically stopping the feed of said elongate strip with one of said elements in predetermined relation to said guide means, said work-feeding means including a feed dog beneath the work and a vertically reciprocable presser foot normally yieldingly influenced to grip the work between said presser foot and said feed dog to move said elongate strip, and the feed-stopping means including an electric switch controlled by said elements, an electric circuit including an electromagnet controlled by said switch, a lever pivotally mounted on a fixed support and actuated in one direction by said electromagnet, and means for connecting said lever to said presser foot to raise the latter when said lever is actuated by said electromagnet.

References Cited in the file of this patent

UNITED STATES PATENTS

| Number | Name | Date |
|---|---|---|
| 1,801,570 | Roseman | Apr. 21, 1931 |
| 1,939,464 | Roseman | Dec. 12, 1933 |
| 2,121,986 | Rohland | June 28, 1938 |
| 2,313,433 | Golden | Mar. 9, 1943 |